United States Patent
Kato et al.

(10) Patent No.: US 10,677,178 B2
(45) Date of Patent: *Jun. 9, 2020

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Akira Kato, Sunto-gun (JP); Shinichi Mitani, Susono (JP); Shintaro Hotta, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 231 days.

This patent is subject to a terminal disclaimer.

(21) Appl. No.: 15/837,120

(22) Filed: Dec. 11, 2017

(65) Prior Publication Data

US 2018/0209360 A1 Jul. 26, 2018

(30) Foreign Application Priority Data

Jan. 24, 2017 (JP) .................................. 2017-010573

(51) Int. Cl.
*F02D 41/00* (2006.01)
*F02D 13/02* (2006.01)
(Continued)

(52) U.S. Cl.
CPC ....... *F02D 41/005* (2013.01); *F02D 13/0276* (2013.01); *F02D 41/0007* (2013.01);
(Continued)

(58) Field of Classification Search
CPC .............. F02D 41/005; F02D 41/0007; F02D 41/0072; F02D 41/2409; F02D 13/0276;
(Continued)

(56) References Cited

U.S. PATENT DOCUMENTS 5,159,905 A * 11/1992 Sugiuchi ................. F01L 1/267
123/90.15
6,510,835 B1 * 1/2003 Mizuno ............... F02D 41/3029
701/103
(Continued)

FOREIGN PATENT DOCUMENTS

JP 6-241073 A 8/1994
JP 2001-214813 A 8/2001
(Continued)

OTHER PUBLICATIONS

Non-Final Office Action dated Oct. 7, 2019 issued by the United States Patent and Trademark Office in U.S. Appl. No. 15/842,946.
(Continued)

*Primary Examiner* — Thai Ba Trieu
(74) *Attorney, Agent, or Firm* — Sughrue Mion, PLLC

(57) ABSTRACT

An operating range boundary for switching a cam for driving an intake valve (drive cam) is changed in a direction of decreasing an engine load if a target EGR rate is predicted to increase across the contour line of the EGR rate. By changing the boundary, the drive cam is switched from a large cam to a small cam before an operating point is transferred from a partitioned range with a low target EGR rate to a partitioned range with a high target EGR rate.

4 Claims, 13 Drawing Sheets

(51) Int. Cl.
*F02D 41/24* (2006.01)
*F02D 41/20* (2006.01)
*F02B 37/00* (2006.01)
*F02D 41/14* (2006.01)

(52) U.S. Cl.
CPC .......... *F02D 41/2422* (2013.01); *F02B 37/00* (2013.01); *F02D 13/0226* (2013.01); *F02D 2041/001* (2013.01); *F02D 2041/1412* (2013.01); *F02D 2200/101* (2013.01); *F02D 2200/602* (2013.01); *F02D 2250/21* (2013.01); *Y02T 10/144* (2013.01); *Y02T 10/18* (2013.01); *Y02T 10/47* (2013.01)

(58) Field of Classification Search
CPC ......... F02D 2041/001; F02D 2200/101; F02B 37/00; F02M 26/06; F01L 1/042; F01L 1/047; F01L 1/08; F01L 1/34; F01L 1/344; F01L 13/0036; F01L 2800/00
USPC ............ 60/605.2; 701/108; 123/90.17, 90.26
See application file for complete search history.

(56) References Cited

U.S. PATENT DOCUMENTS

| | | | | |
|---|---|---|---|---|
| 2012/0215419 | A1* | 8/2012 | Kamio | F02D 41/005 |
| | | | | 701/103 |
| 2015/0152801 | A1* | 6/2015 | Racelis | F02D 41/2474 |
| | | | | 123/349 |
| 2015/0152802 | A1* | 6/2015 | Racelis | F02D 41/2474 |
| | | | | 701/102 |
| 2017/0009682 | A1* | 1/2017 | Okunishi | F02D 41/0072 |

FOREIGN PATENT DOCUMENTS

| | | |
|---|---|---|
| JP | 2004-263581 A | 9/2004 |
| JP | 2007-278208 A | 10/2007 |
| JP | 2013-072342 A | 4/2013 |
| JP | 2013-234622 A | 11/2013 |
| JP | 2016-89749 A | 5/2016 |

OTHER PUBLICATIONS

Notice of Allowance dated Feb. 13, 2020 by the United States Patent and Trademark Office in U.S. Appl. No. 15/842,946.

* cited by examiner

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2017-10573, filed on Jan. 24, 2017. The contents of these applications are incorporated herein by reference in their entirety.

TECHNICAL FIELD

The present disclosure relates to a control device for an internal combustion engine.

BACKGROUND

JP 2013-72342 A discloses a control device for an internal combustion engine which is configured to control an engine in which a part of exhaust gas as external EGR gas is recirculated from an exhaust system to an intake system. In such a conventional control device, an opening degree of an EGR valve is controlled based on a map defining a relationship between an operating range defined by engine speed and engine load and a target amount of external EGR gas (hereinafter referred to as a "target EGR amount"). In the map, the operating ranges are partitioned by contour lines of the target EGR amount. According to the map, the target EGR amount is set to a highest value in a partitioned range including a middle-engine-speed-and-middle-engine-load range, and decreases from this partitioned range toward a peripheral partitioned range.

The target EGR amounts in the map are obtained by an experiment or simulation performed in advance. According to the map, an actual external EGR amount (hereinafter also referred to as an "actual EGR amount") can be maintained at an optimum value during a steady operation in which the engine operating state stays in a partitioned range having an equal target EGR amount. On the other hand, the actual EGR amount is largely affected by time lag during a transition operation in which the engine operating state is transferred across the contour line of the target EGR amount. When the engine operating state is transferred from a partitioned range with low target EGR amount to a partitioned range with high target EGR amount, for example, the large influence by time lag causes a period during which the actual EGR amount does not achieve the target EGR amount, resulting in knocking easily occurring in the period. Accordingly, a countermeasure against such knocking during the transition operation is needed.

The present disclosure addresses the above described problem, and an object of the present disclosure is to take a knocking countermeasure when the engine operating state is transferred from the partitioned range with low target amount to the partitioned range with high target amount, in a case where an opening degree of an EGR valve is controlled based on the map defining a relationship between the target amount of external EGR gas and the engine operating range.

A first aspect of the present disclosure is a control device for an internal combustion engine which is configured to control an engine in which a part of exhaust gas as external EGR gas is recirculated from an exhaust system to an intake system,
wherein the control device comprising:

an EGR map the defines a relationship between an operating range defined by engine speed and engine load and a target value of external EGR rate, and has a predetermined partitioned range in which the target value is set to a highest value; and an operating angle map that defines a relationship between the operating range and an operating angle of an intake cam for driving an intake valve of the engine, wherein the operating angle map being set so that a large operating angle is selected in a first region including a region corresponding to the predetermined partitioned range, the large operating angle being capable of closing the intake valve in a first crank angle section including a crank angle at which a suction efficiency becomes highest, and a small operating angle is selected in a second region in which the engine load is higher than that of the first region, the small operating angle being capable of closing the intake valve in a second crank angle section that is located nearer to a bottom dead center side than the first crank angle section, wherein the control device is configured to:

select the operating angle in accordance with the operating angle map when it is predicted that the engine operating state stays in a partitioned range having the equal target value in the EGR map; and when it is predicted that the engine operating state is transferred from a partitioned range with the low target value to a partitioned range with the high target value in the EGR map, change a boundary between the first region and the second region in a direction of decreasing the engine load, and then select the operating angle in accordance with the operating angle map.

A second aspect of the present disclosure is the control device for an internal combustion engine according to the first aspect, wherein the control device is further configured to:

when it is predicted that the engine operating state is transferred from a partitioned range with the low target value to a partitioned range with the high target value in the EGR map, when the engine operating state is transferred in a direction of increasing the engine speed and the engine load, increase a degree of a change of the boundary as a positive change rate of an accelerator opening degree of the engine becomes larger; and when the engine operating state is transferred in a direction of decreasing the engine speed and the engine load, increase the degree of the change of the boundary as a negative change rate of the accelerator opening degree becomes larger.

A third aspect of the present disclosure is the control device for an internal combustion engine according to the first aspect, wherein the control device is further configured to:

when it is predicted that the engine operating state is transferred from a partitioned range with the low target value to a partitioned range with the high target value in the EGR map, calculate a time interval from a change point of the target value set in accordance with the EGR map to an increase starting point of an actual external EGR rate; and increase the degree of the change of the boundary as the time interval is larger.

A fourth aspect of the present disclosure is the control device for an internal combustion engine according to any one of the first to third aspects, wherein the engine comprising a turbocharger including a compressor and a turbine, and the external EGR gas is recirculated from a downstream side of the turbine to an upstream side of the compressor.

According to the first aspect, when it is predicted that the engine operating state is transferred from a partitioned range with low target value of the external EGR rate to a partitioned range with high target value of the external EGR rate in the EGR map, the boundary between the first region and the second region is changed in a direction of decreasing the engine load, and then the operating angle can be selected in accordance with the operating angle map. Thus, when the target value of the external EGR rate increases, the small operating angle can be selected in a period during which the actual external EGR rate does not achieve the target value. The intake valve can be closed in the second crank angle section by selecting the small operating angle, thereby lowering the suction efficiency as compared to a case where the large operating angle is selected to close the intake valve in the first crank angle section including a crank angle at which the suction efficiency becomes highest. Accordingly, an in-cylinder condition can be improved in the period during which the actual EGR rate does not achieve the target EGR rate, to avoid a state liable to cause knocking. Since the second crank angle section is located nearer to the bottom dead center side than the first crank angle section, the gas amount returned to an intake port from a cylinder while the intake valve is opened can be reduced, thereby suppressing a temperature increase of in-cylinder gas. Even when the suction efficiency is not lowered as compared to a case where the large operating angle is selected regardless of selecting the small operating angle, the state liable to cause knocking can be avoided.

According to the second aspect, the degree of the change of the boundary between the first region and the second region can be changed in accordance with the change rate of the accelerator opening degree. Accordingly, the in-cylinder condition in the period during which the actual external EGR rate does not achieve the target external EGR rate is improved in accordance with the degree of the influence by the time lag, to avoid a state liable to cause knocking.

According to the third aspect, the time lag from the change point of the target value of the external EGR rate set in accordance with the EGR map to the increase starting point of the actual value of the external EGR rate is directly calculated, and the degree of the change of the boundary between the first region and the second region can be increased as the time lag is larger. Therefore, the in-cylinder condition can be improved in the period during which the actual external EGR rate does not achieve the target value of the external EGR rate, to avoid a state liable to cause knocking.

According to the fourth aspect, an in-cylinder condition of the engine provided with an LPL-EGR device can be improved in the period during which the actual external EGR rate does not achieve the target value of the external EGR rate, to avoid a state liable to cause knocking.

DESCRIPTION OF EMBODIMENTS

Figure 1:
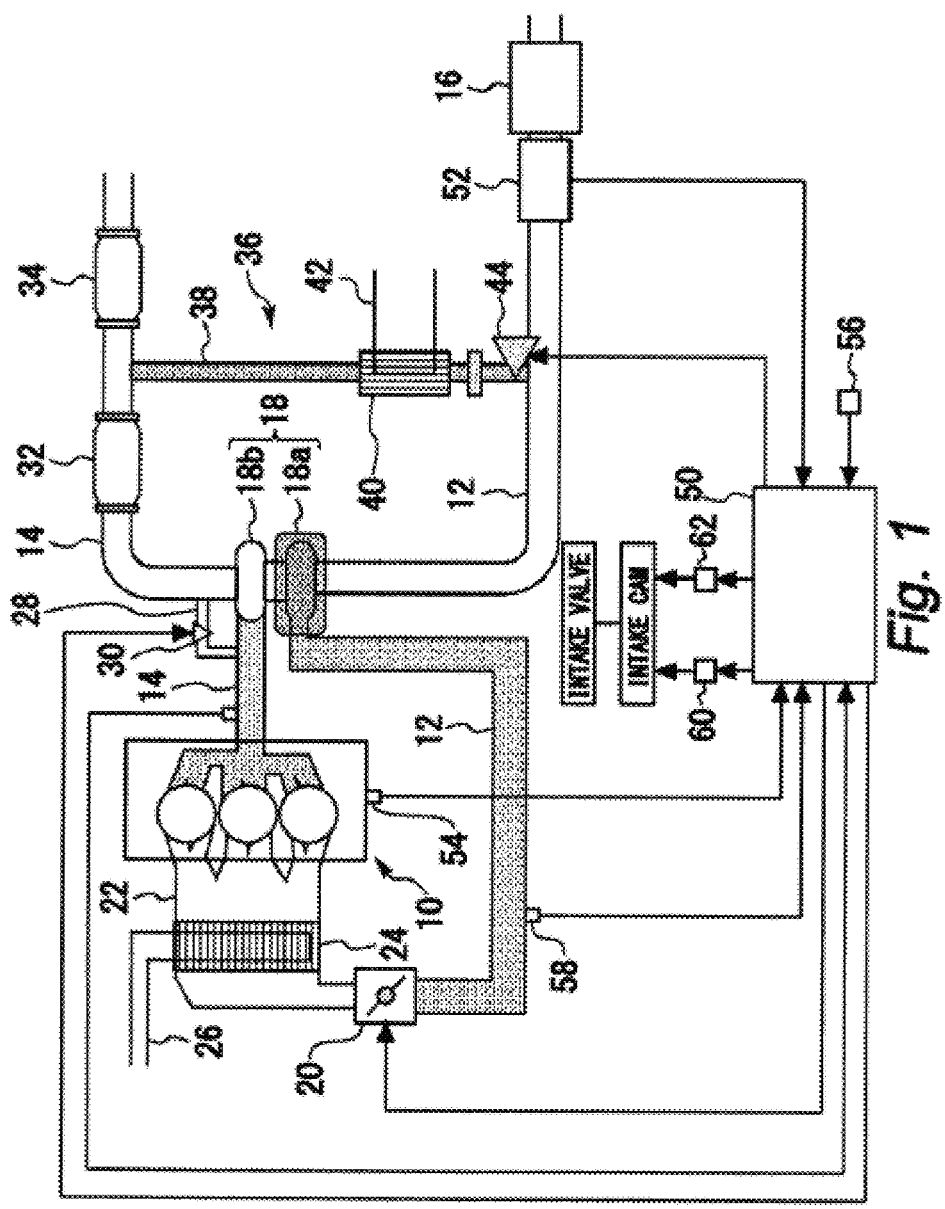
FIG. 1 is a diagram illustrating a configuration example of a system according to a first embodiment of the present disclosure.

Hereinafter, embodiments of the present disclosure are described based on the drawings. It is to be noted that common elements in each figure are designated by the same reference numerals, and duplicated description thereof are omitted herein. It is also to be noted that the following embodiments do not limit the present disclosure.

First Embodiment

A first embodiment of the present disclosure is described with reference to FIGS. 1 to 8.

[Description of System Configuration Example]

FIG. 1 is a diagram illustrating a configuration example of a system according to the first embodiment of the present disclosure. The system illustrated in FIG. 1 is a system for an internal combustion engine mounted in a vehicle. The system illustrated in FIG. 1 includes an internal combustion engine 10 as a driving source. The internal combustion engine 10 is a four-stroke reciprocating engine, and also an in-line three cylinder engine. It is to be noted that the number and arrangement of cylinders of the internal combustion engine 10 are not particularly limited to the above-described number and arrangement. Each cylinder of the internal combustion engine 10 communicates with an intake pipe 12 and an exhaust pipe 14.

An intake system of the internal combustion engine 10 is described. An air cleaner 16 is attached in the vicinity of an inlet of the intake pipe 12. A compressor 18a of a turbocharger 18 is provided downstream of the air cleaner 16. The compressor 18a is driven by rotation of a turbine 18b that is provided in the exhaust pipe 14, to compress intake air. An electronic control throttle valve 20 is provided downstream of the compressor 18a. An intake manifold 22 that is connected to intake ports of each cylinder is provided downstream of the throttle valve 20. A water-cooled type intercooler 24 is incorporated in the intake manifold 22. Intake air flowing in the intercooler 24 is cooled by heat exchange with cooling water flowing in a cooling pipe 26.

Next, an exhaust system of the internal combustion engine 10 is described. The turbine 18b of the turbocharger 18 is attached to the exhaust pipe 14. The turbine 18b is connected to the compressor 18a. The turbine 18b is rotated by energy of exhaust gas flowing in the exhaust pipe 14. A bypass pipe 28 that bypasses the turbine 18b is provided in a middle of the exhaust pipe 14. A WGV (waste gate valve) 30 is provided in the bypass pipe 28. The WGV 30 is opened when an exhaust pipe pressure (back pressure) on an upstream side of the turbine 18b is higher than a predetermined value. When the WGV 30 is opened, a part of exhaust gas flowing in the upstream side of the turbine 18b flows into the downstream side of the turbine 18b through the bypass pipe 28. Catalysts 32 and 34 for cleaning exhaust gas are provided in the downstream side of the turbine 18b.

Next, an EGR system for the internal combustion engine 10 is described. The internal combustion engine 10 includes an LPL-EGR (low pressure loop—EGR) device 36. The LPL-EGR device 36 includes an EGR pipe 38 that connects the exhaust pipe 14 between the catalysts 32 and 34, and the intake pipe 12 on the upstream side of the compressor 18a. A water-cooled type EGR cooler 40 is provided in the middle of the EGR pipe 38. Exhaust gas flowing in the EGR cooler 40 (i.e., external EGR gas) is cooled by heat exchange with cooling water flowing in a cooling pipe 42. An electronic control EGR valve 44 is provided on the downstream side of the EGR cooler 40. A change of an opening degree of the EGR valve 44 causes a change of a flow amount of the external EGR gas that flows from the EGR pipe 38 into the intake pipe 12. When the opening degree of the EGR valve 44 becomes larger, an external EGR rate increases.

Figure 2:
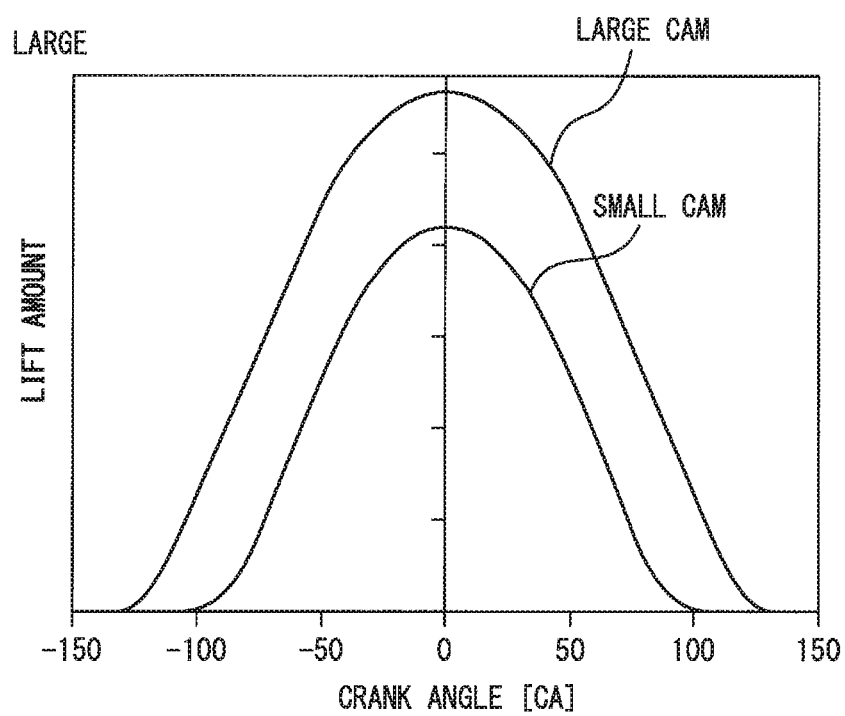
FIG. 2 is an exemplary graph describing cam profiles of two types of intake cams that are provided in the system according to the first embodiment of the present disclosure.

Next, a valve system for the internal combustion engine 10 is described. FIG. 2 is an exemplary graph describing cam profiles (meaning at least one of a lift amount and an operating angle, the same shall apply hereinafter) of two types of intake cams that are provided in the system according to the first embodiment of the present disclosure. As illustrated in FIG. 2, the system according to the first embodiment includes a large cam and a small cam as the two types of intake cams. The small cam has an operating angle and a lift amount that are smaller than those of the large cam. The large cam and the small cam are carried on a camshaft that rotates in synchronization with a crankshaft. Two pair of large and small cams are carried on one cylinder because two intake valves are provided per cylinder. However, the number of intake valves per cylinder in the present disclosure may be one, or three or more. One of the intake cams is used as an intake cam for driving the intake valve (hereinafter also referred to as "drive cam"). The drive cam is switched between the large cam and the small cam by a switching operation of a switching mechanism.

The camshaft carrying the large cam and the small cam is provided with a VVT (variable valve timing mechanism). The VVT is a mechanism that varies a rotational phase difference of the camshaft with respect to the crankshaft thereby to vary a valve opening characteristic of the intake valve. The VVT includes a housing that is connected to the crankshaft through a timing chain or the like, and a valve body that is provided in the housing and attached to an end portion of the camshaft. Hydraulic pressure is supplied into a hydraulic chamber partitioned by the housing and the valve body, to thereby enable the valve body to be relatively rotated with respect to the housing, and further enable the rotational phase difference of the camshaft with respect to the crankshaft to be varied. The hydraulic pressure supplied to the VVT is controlled by a hydraulic pressure control valve provided in a hydraulic pressure supply line. A system of the VVT is known, and a configuration of the system is not limited in the present disclosure, and thus the further descriptions of the VVT are omitted.

Returning to FIG. 1, the configuration example of the system is continuously described. The system illustrated in FIG. 1 includes an ECU (Electronic Control Unit) 50 as a control device. The ECU 50 includes a RAM (Random Access Memory), a ROM (Read Only Memory), a CPU (microprocessor) and the like. The ECU 50 takes in and processes signals from various sensors mounted in a vehicle. The various sensors include an air flow meter 52, a crank angle sensor 54, an accelerator opening degree sensor 56, and a supercharging pressure sensor 58. The air flow meter 52 is provided in the vicinity of the air cleaner 16, and detects an intake air amount. The crank angle sensor 54 outputs a signal according to a rotation angle of the crankshaft. The accelerator opening degree sensor 56 detects a step-on amount of an accelerator pedal by a driver. The supercharging pressure sensor 58 detects an intake pipe pressure (supercharging pressure) on the upstream side of the throttle valve 20. The ECU 50 takes in and processes the signals from the various sensors to operate various actuators in accordance with a predetermined control program. The various actuators include the above-described throttle valve 20 and WGV 30. The various actuators also include a VVT 60 and a cam switching mechanism 62.

[Characteristic Control in First Embodiment]

Figure 3:
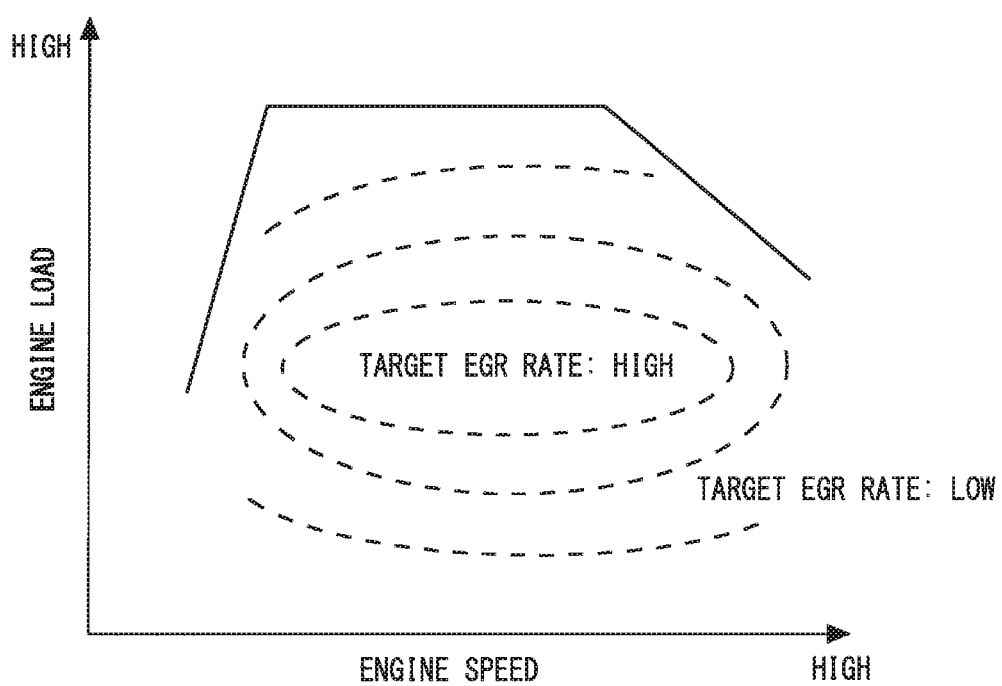
FIG. 3 is an exemplary graph showing a relationship between an engine operating range and a target EGR rate.

FIG. 3 is an exemplary graph showing a relationship between an engine operating range and a target EGR rate. The relationship in FIG. 3 is created based on a simulation performed in advance. It is to be noted that the target EGR rate means a target value obtained by dividing an external EGR gas amount by an intake air amount, or can be also referred to as a value obtained by dividing the above-described target EGR amount by the intake air amount. Among ranges partitioned by contour lines shown in FIG. 3, the target EGR rate is set to the highest value in the partitioned range including a middle-engine-speed-and-middle-engine-load range. Thus, the external EGR rate is increased in the middle-engine-speed-and-middle-engineload range that is used with particularly high frequency, to decrease an intake air temperature, thereby improving the heat efficiency. The target EGR rate is set to a lower value in an operating range for which the frequency of use becomes relatively lower. Specifically, the target EGR rate is set to a lower value in the partitioned ranges including a high engine load range and a low engine load range compared with a value in the partitioned ranges including a middle engine load range. Similarly, the target EGR rate is set to a lower value in the partitioned ranges including a high engine speed range and a low engine speed range compared with a value in the partitioned ranges including a middle engine speed range. In the first embodiment, the relationship shown in FIG. 3 is stored in the ROM of the ECU as a map, and an actual operating state is applied to the map to thereby control an opening degree of the EGR valve.

Figure 4:
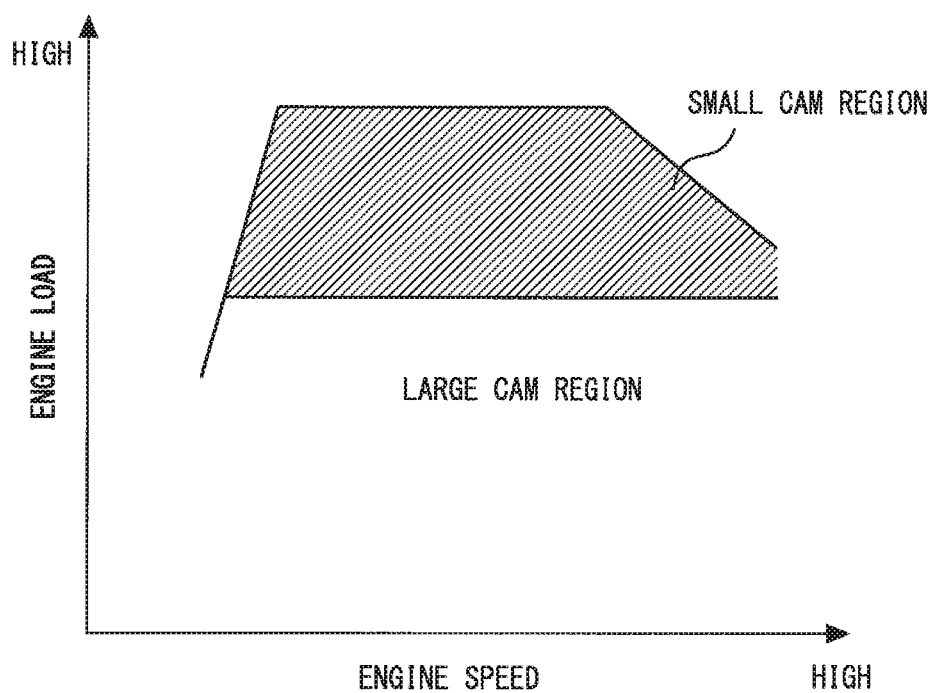
FIG. 4 is an exemplary graph showing a relationship between the engine operating range and the cam for driving the intake valve.

In the first embodiment, the engine is controlled by combining an intake valve closing timing with the above-described target EGR rate. FIG. 4 is an exemplary graph showing a relationship between the engine operating range and the cam for driving the intake valve. As shown in FIG. 4, the large cam is selected in the middle-engine-speed-and-middle-engine-load range and the low-engine-speed-and-low-engine-load range, and the small cam is selected in the high-engine-speed-and-high-engine-load range. In the first embodiment, the relationship shown in FIG. 4 is stored in the ROM of the ECU as a map, and an actual operating state is applied to the map to thereby control the switching operation of the cam switching mechanism.

Figure 5:
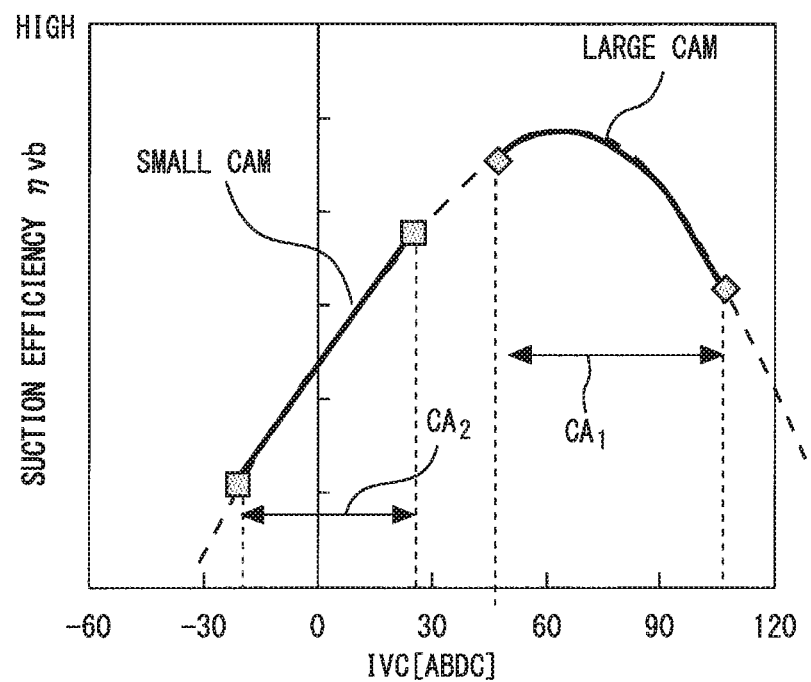
FIG. 5 is an exemplary graph describing an intake valve closing timing.

FIG. 5 is an exemplary graph describing an intake valve closing timing. As shown in FIG. 5, when a drive cam is a large cam, the intake valve is closed in a crank angle section $CA_1$ retarded with respect to a bottom dead center (ABDC=0). On the other hand, when a drive cam is a small cam, the intake valve is early closed in a crank angle section $CA_2$ including the bottom dead center. Widths of the crank angle sections $CA_1$, $CA_2$ as shown in FIG. 5 are provided to change the intake valve closing timing by the VVT. However, when the large cam is selected as the drive cam to increase the engine output, the crank angle section $CA_1$ is set so as to include a crank angle at which the suction efficiency is maximized. On the other hand, when the small cam having a small lift amount is selected as the drive cam, the crank angle section $CA_2$ is set so as not to include the crank angle at which the suction efficiency is maximized. It is to be noted that the suction efficiency shown in FIG. 5 can be obtained under operating conditions in which the engine speed is fixed, for example.

Figure 6:
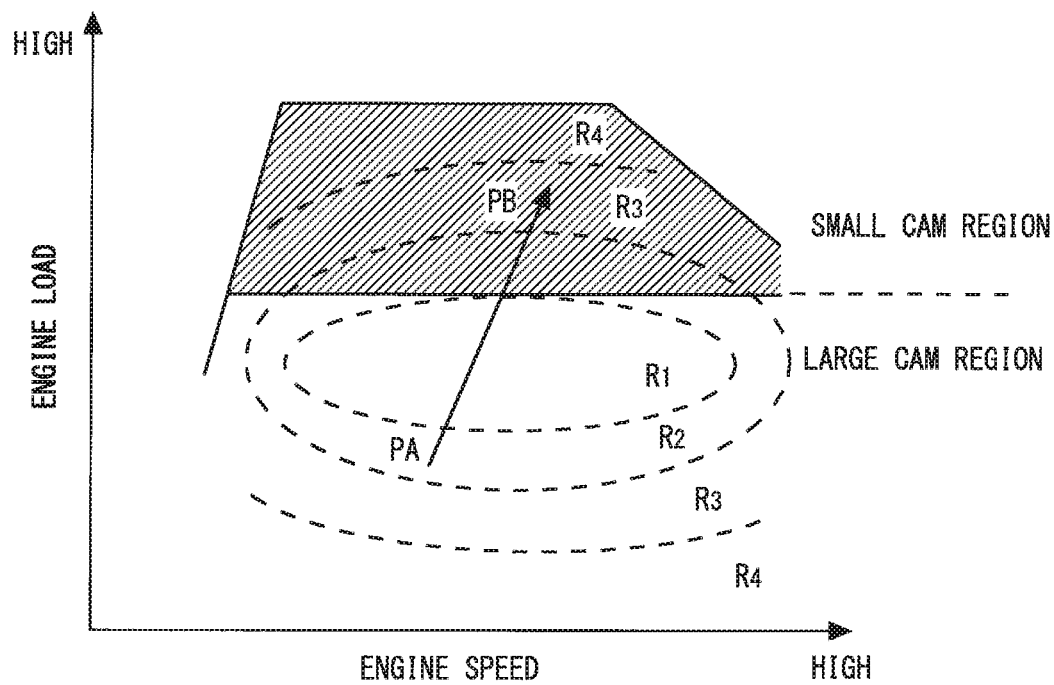
FIG. 6 is an exemplary graph showing a change in the engine operating state during a transition operation (acceleration operation)

When the EGR valve is controlled based on the relationship shown in FIG. 3, an actual external EGR rate (hereinafter also referred to as an "actual EGR rate") can be controlled to an optimum value during a steady operation in which the engine operating state stays in a partitioned range having an equal target EGR rate. On the other hand, the actual EGR rate is largely affected by time lag during a transition operation in which the engine operating state is transferred across the contour line of the target EGR rate. This problem is described with reference to FIG. 6. FIG. 6 is an exemplary graph showing a change in the engine operating state during the transition operation. FIG. 6 is a graph in which the relationships shown in FIG. 3 and FIG. 4 are combined. FIG. 6 shows an example of a change in the engine operating state during an acceleration operation. This example assumes that the engine operating state is changed from an operating point PA to an operating point PB. When the operating point is transferred from PA to PB, the operating point is transferred from a partitioned range $R_2$ to a partitioned range $R_1$, and further transferred from the partition range $R_1$ through the partition range $R_2$ to a partitioned range $R_3$.

The target EGR rate is set to the highest value in the partitioned range $R_1$, and becomes lower in order of the partitioned ranges $R_2$, $R_3$, and $R_4$. Thus, when the operating point is transferred from PA to PB, the target EGR rate temporarily increases, then decreases. However, the time lag produces a period during which the actual EGR rate does not achieve the target EGR rate while the target EGR rate increases. When the actual EGR rate does not achieve the target EGR rate, the heat efficiency maintained by the high external EGR rate is lowered, and knocking easily occurs.

Figure 7:
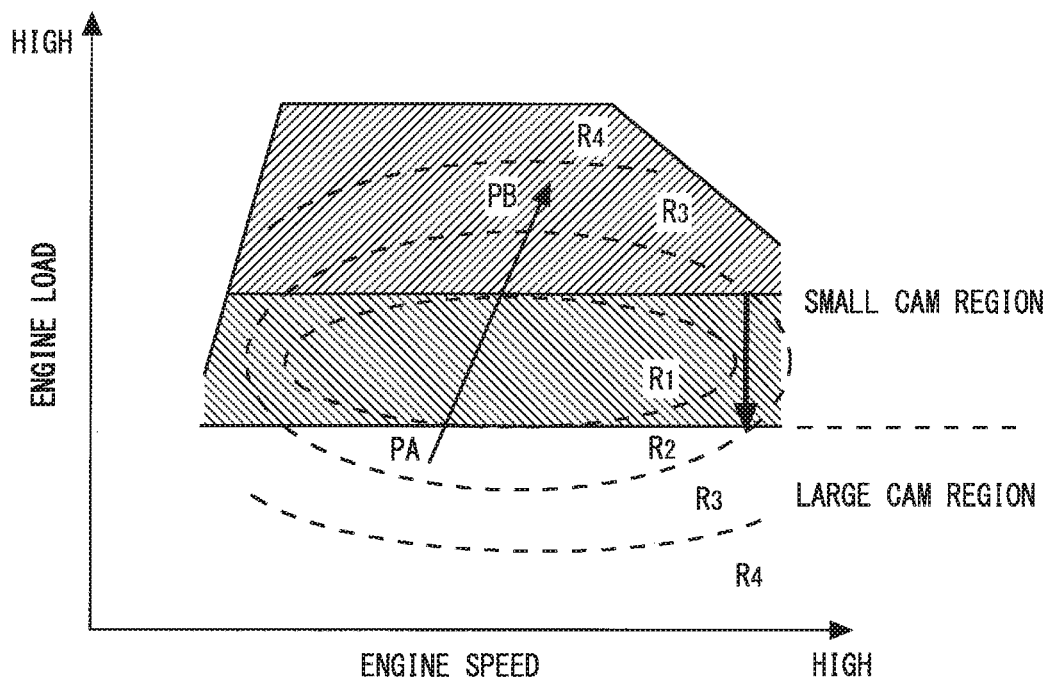
FIG. 7 is a graph describing a method of changing a switching boundary in the first embodiment of the present disclosure.

In consideration of these reasons, in the first embodiment, an operating range boundary for switching the drive cam (hereinafter also referred to as a "switching boundary") is changed in a direction of decreasing the engine load if the target EGR rate is predicted to increase across the contour line shown in FIG. 3. FIG. 7 is a graph describing a method of changing the switching boundary in the first embodiment of the present disclosure. Operating points PA, PB and partitioned ranges $R_1$ to $R_4$ that are shown in FIG. 7 correspond to the operating points PA, PB and partitioned ranges $R_1$ to $R_4$ that are shown in FIG. 6, respectively. As can be seen from comparing FIG. 6 and FIG. 7, the switching boundary in FIG. 7 is changed in the direction of decreasing the engine load. By thus changing, the drive cam is switched from the large cam to the small cam before the operating point is transferred from the partitioned range $R_2$ to the partitioned range $R_1$.

As can be seen from FIG. 5, when the small cam is selected as the drive cam, the intake valve is closed in the crank angle section $CA_2$. Thus, when the intake valve is closed in the crank angle section $CA_2$, the suction efficiency is frequently lower than that when the large cam is selected as the drive cam. The drive cam is switched to the small cam before the operating point is transferred from the partitioned range $R_2$ to the partitioned range $R_1$, thereby enabling the suction efficiency to be lowered in many cases. Accordingly, in many cases, the in-cylinder condition can be improved in the period during which the actual EGR rate does not achieve the target EGR rate, to avoid a state liable to cause knocking.

As can be seen from FIG. 5, the crank angle section $CA_2$ is located nearer to the bottom dead center side than the crank angle section $CA_R$. Thus, after air is taken in the cylinder from the intake port while the intake valve is opened, a gas amount returned to the intake port during rising of the piston can be reduced. When the gas amount returned to the intake port from the cylinder while the intake valve is opened is increased, a temperature of the intake port is increased. When the temperature of the intake port is increased, a gas temperature in the intake port is increased, resulting in the gas temperature in the cylinder being increased. In this respect, when the drive cam is switched to the small cam before the operating point is transferred from the partitioned range $R_2$ to the partitioned range $R_1$, the intake valve closing timing can approach the bottom dead center side. Accordingly, the gas amount returned to the intake port from the cylinder while the intake valve is opened can be reduced, thereby suppressing the temperature increase of the in-cylinder gas. Even if the above-described suction efficiency is not sufficiently lowered, the in-cylinder condition can be improved in the period during which the actual EGR rate does not achieve the target EGR rate, to avoid a state liable to cause knocking.

Figure 8:
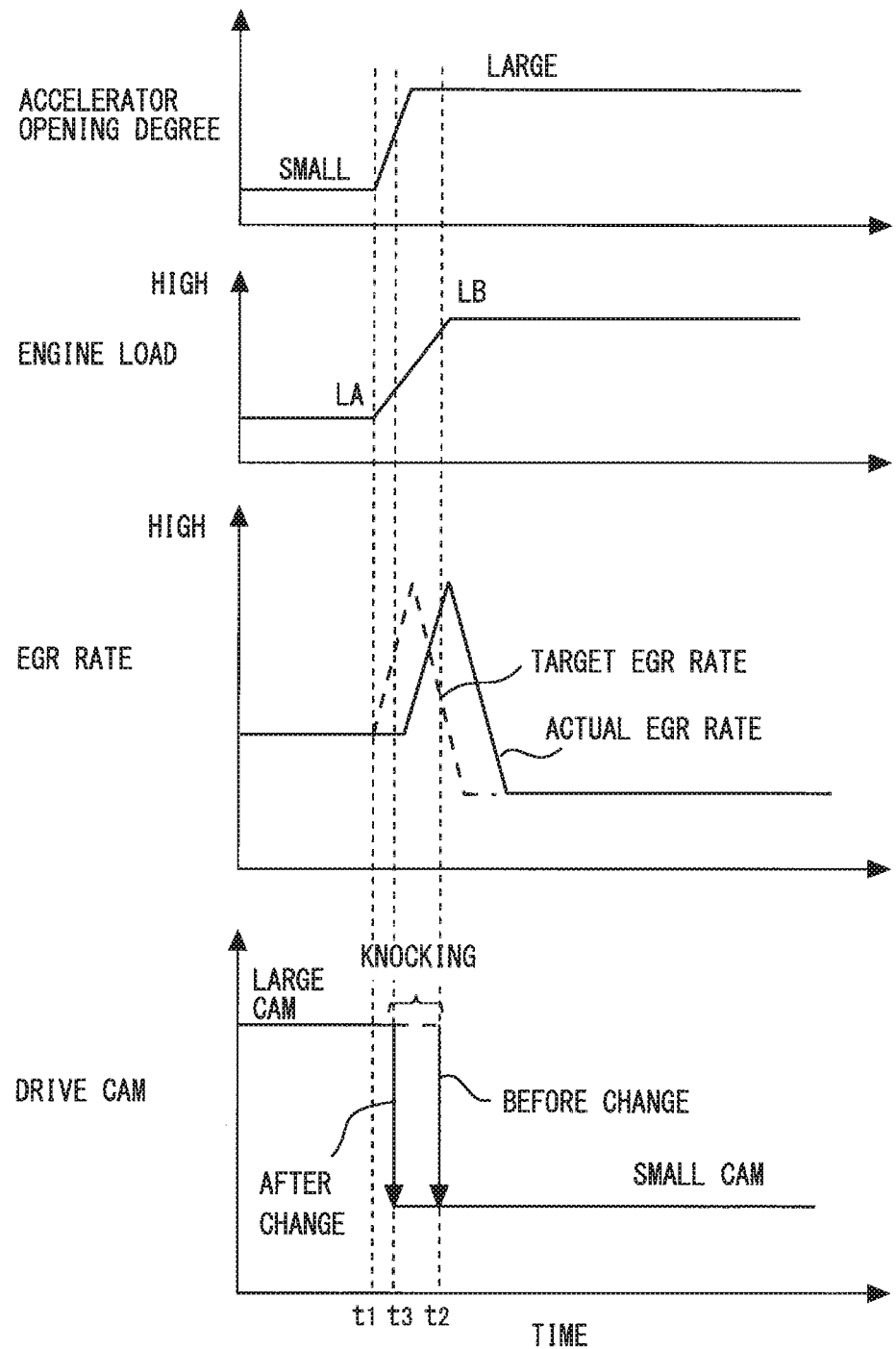
FIG. 8 is time charts describing a relationship between transitions of an accelerator opening degree, an engine load, and an external EGR rate, and a drive cam, respectively, when an operating point is transferred from PA to PB as shown in FIG. 6.

FIG. 8 is time charts describing a relationship between transitions of an accelerator opening degree, an engine load, and an external EGR rate, and a drive cam, respectively, when the operating point is transferred from PA to PB as shown in FIG. 6. As shown in FIG. 8, the accelerator opening degree starts to increase at a time $t_1$. When the accelerator opening degree increases, the engine load increases from LA to LB. It is to be noted that the engine load LA shown in FIG. 8 represents the engine load at the operating point PA shown in FIG. 6, and the engine load LB represents the engine load at the operating point PB shown in FIG. 6.

Since the target EGR rate follows the relationship shown in FIG. 3, when the engine load increases after the time $t_1$, the target EGR rate increases. When the target EGR rate increases, the EGR valve opening degree becomes larger, and the actual EGR rate also increases. The actual EGR rate starts to increase after the time $t_1$ because this is affected by the above-described time lag. It is to be noted that the target EGR rate starts to decrease after reaching the maximum valve because the operating point is transferred from the partitioned range $R_1$ to the partitioned range $R_2$ as shown in FIG. 6.

The ECU predicts whether the target EGR rate increases across the contour line shown in FIG. 6 based on a change rate of the accelerator opening degree after the time $t_1$. For example, the ECU stores in the ROM a threshold set in advance based on intervals between the contour lines of the target EGR to compare between the threshold and the change rate of the accelerator opening rate. When the ECU determines that the change rate of the accelerator opening degree exceeds the threshold after the time $t_1$, the ECU predicts that the target EGR rate increases across the contour line shown in FIG. 3.

In FIG. 8, it is predicted that the target EGR rate increases across the contour line shown in FIG. 3. When the large cam is continuously selected as the drive cam until the time $t_2$ based on the relationship shown in FIG. 4, knocking easily occurs. In this respect, in the first embodiment, since the switching boundary is changed in the direction of decreasing the engine load, the drive cam is switched from the large cam to the small cam at a time $t_3$ earlier than the time $t_2$. Accordingly, the in-cylinder condition can be improved in the period during which the actual EGR rate does not achieve the target EGR rate, to avoid a state liable to cause knocking.

In the above-described first embodiment, the map defining the relationship shown in FIG. 3 corresponds to an "EGR map" in a first aspect. The map defining the relationship shown in FIG. 4 corresponds to an "operating angle map" of the first aspect. The partitioned range $R_1$ shown in FIG. 6 corresponds to a "predetermined partitioned range" of the first aspect. The crank angle section $CA_1$ described in FIG. 5 corresponds to a "first crank angle section" of the first aspect. The crank angle section $CA_2$ corresponds to a "second crank angle section" of the first aspect.

Second Embodiment

Figure 9:
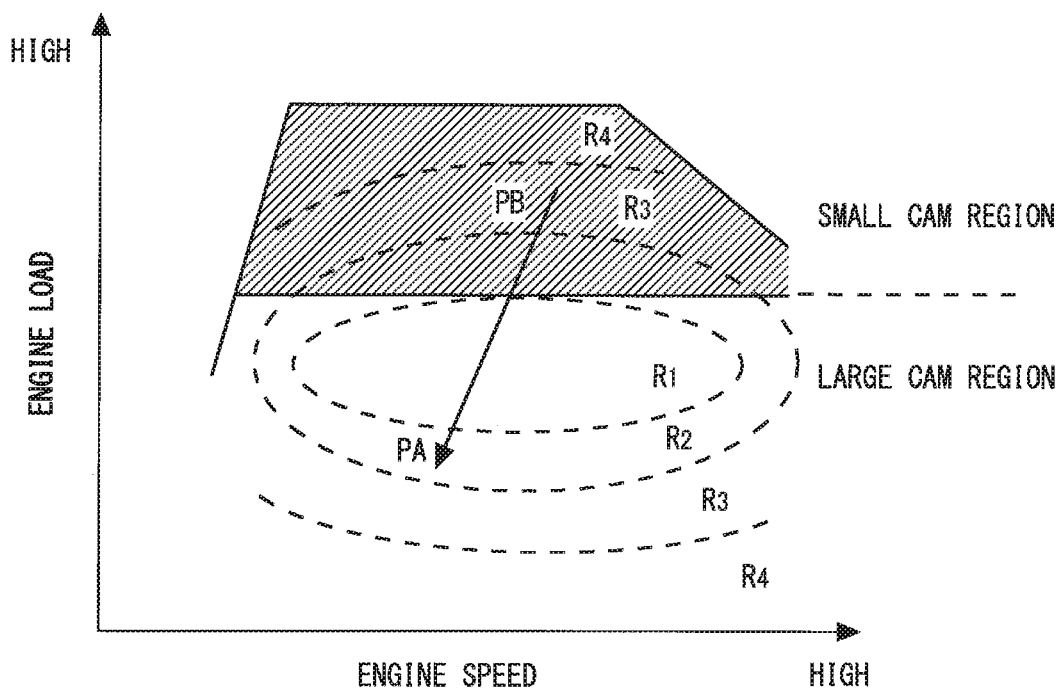
FIG. 9 is an exemplary graph showing a change in the engine operating state during the transition operation (deceleration operation)

A second embodiment of the present disclosure is described with reference to FIGS. 9 to 11. It is to be noted that a basic configuration of a system of the second embodiment is common with the configuration example described in FIGS. 1 to 2. The maps determining the relationships described in FIGS. 3 to 4 are used in the engine control as they are. The crank angle sections $CA_1$, $CA_2$ described in FIG. 5 are applied for the intake valve closing timings as they are. Hereinafter, portions different from those in the first embodiment is described.

[Characteristic Control in Second Embodiment]

In the first embodiment, the engine operating state during the acceleration operation is described as an example of the transition operation. However, the transition operation includes a deceleration in addition to the acceleration operation, and the actual EGR rate is also largely affected by the above-described time lag during the deceleration operation. This problem is described with reference to FIG. 9. FIG. 9 shows an example of a change in the engine operating state during the deceleration operation. This example assumes that the engine operating state is changed from an operating point PB to an operating point PA. It is to be noted that the operating points PA, PB and partitioned ranges $R_1$ to $R_4$ shown in FIG. 9 correspond to the operating points PA, PB and the partitioned ranges $R_1$ to $R_4$ shown in FIG. 6, respectively.

As described in FIG. 6, the target EGR rate is set to the highest value in the partitioned range $R_1$, and becomes lower in order of the partitioned ranges $R_2$, $R_3$, and $R_4$. Thus, when the operating point is transferred from PB to PA, the target EGR rate temporarily increases, then decreases. However, the time lag produces a period during which the actual EGR rate does not achieve the target EGR rate while the target EGR rate increases. The same problem as that described in FIG. 6 also occurs during the deceleration operation.

In the second embodiment, the switching boundary is changed in the direction of decreasing the engine load, similarly to the first embodiment. FIG. 10 is a graph describing a method of changing the switching boundary in the second embodiment of the present disclosure. Operating points PA, PB and partitioned ranges $R_1$ to $R_4$ that are shown in FIG. 10 correspond to the operating points PA, PB and partitioned ranges $R_1$ to $R_4$ that are shown in FIG. 6, respectively. As can be seen from comparing FIG. 9 and FIG. 10, the switching boundary in FIG. 10 is changed in the direction of decreasing the engine load. By thus changing, the small cam is continuously selected as the drive cam even after the operating point is transferred from the partitioned range $R_2$ to the partitioned range $R_1$.

As described in the first embodiment, when the small cam is selected as the drive cam, the intake valve is closed in the crank angle section $CA_2$, and the suction efficiency is frequently lower than that the large cam is selected as the drive cam. Since the crank angle section $CA_2$ is located nearer to the bottom dead center side than the crank angle section $CA_1$, the gas amount returned to the intake port from the cylinder while the intake valve is opened can be reduced, thereby suppressing the temperature increase of the in-cylinder gas. Thus, if the small cam is continuously selected as the drive cam even after the operating point is transferred from the partitioned range $R_2$ to the partitioned range $R_1$, the in-cylinder condition can be improved in the period during which the actual EGR rate does not achieve the target EGR rate, to avoid a state liable to cause knocking.

Figure 10:
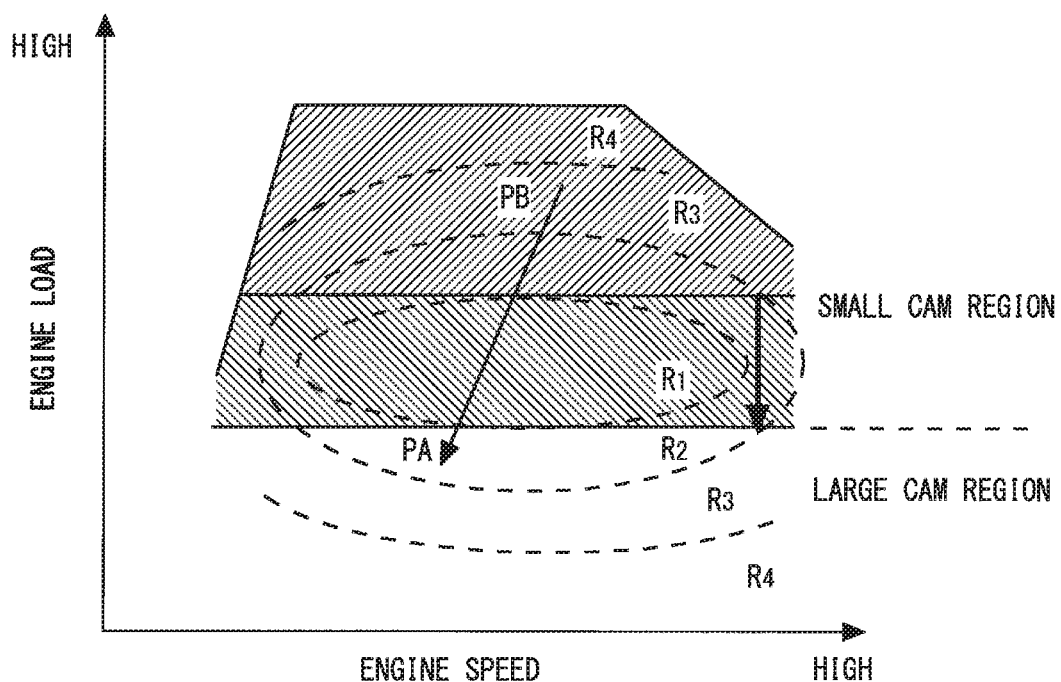
FIG. 10 is a graph describing a method of changing a switching boundary in a second embodiment of the present disclosure.
Figure 11:
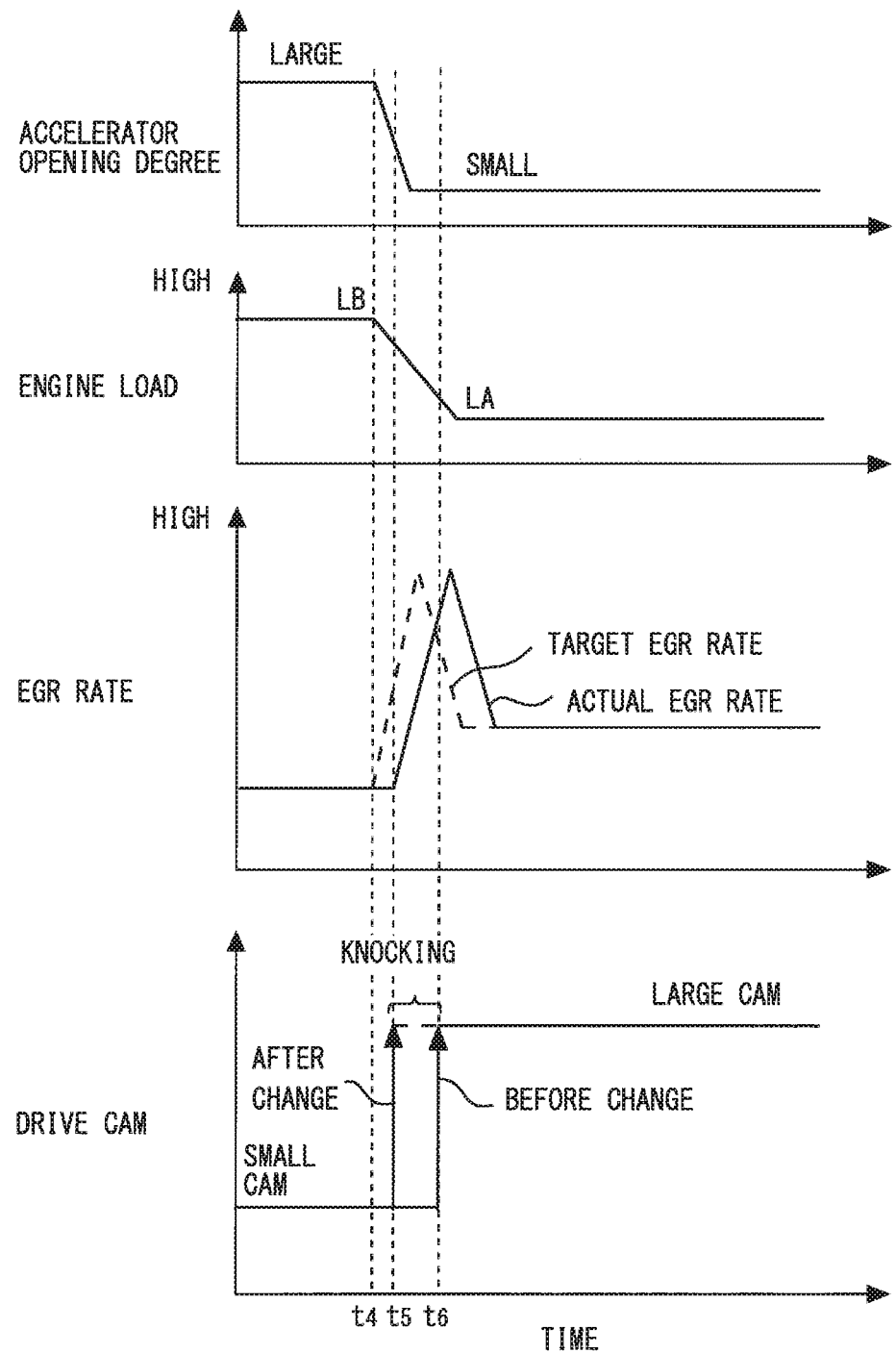
FIG. 11 is time charts describing a relationship between transitions of an accelerator opening degree, an engine load, and an external EGR rate, and a drive cam, respectively, when the operating point is transferred from PB to PA as shown in FIG. 10.

FIG. 11 is time charts describing a relationship between transitions of an accelerator opening degree, an engine load, and an external EGR rate, and a drive cam, respectively, when the operating point is transferred from PB to PA as shown in FIG. 10. As shown in FIG. 10, the accelerator opening degree starts to decrease at a time $t_4$. When the accelerator opening degree decreases, the engine load decreases from LB to LA. It is to be noted that the engine load LA shown in FIG. 11 represents the engine load at the operating point PA shown in FIG. 10, and the engine load LB represents the engine load at the operating point PB shown in FIG. 10.

Since the target EGR rate follows the relationship shown in FIG. 3, when the engine load decreases after the time $t_4$, the target EGR rate increases. When the target EGR rate increases, the EGR valve opening degree becomes larger, and the actual EGR rate also increases. The actual EGR rate starts to increase after the time $t_4$ because this is affected by the above-described time lag. It is to be noted that the target EGR rate starts to decrease after reaching the maximum valve because the operating point is transferred from the partitioned range $R_1$ to the partitioned range $R_2$ as shown in FIG. 10.

The ECU predicts whether the target EGR rate decreases across the contour line shown in FIG. 10 based on a change rate of the accelerator opening degree after the time $t_4$. Examples of the prediction method include the exemplary prediction method described in the first embodiment.

In FIG. 11, it is predicted that the target EGR rate decreases across the contour line shown in FIG. 3. When the drive cam is switched from the small cam to the large cam at a time $t_5$ based on the relationship shown in FIG. 4, knocking easily occurs. In this respect, in the second embodiment, since the switching boundary is changed in the direction of decreasing the engine load, the switching to the large cam is waited until a time $t_6$ later than the time $t_5$. Accordingly, the in-cylinder condition can be improved in the period during which the actual EGR rate does not achieve the target EGR rate, to avoid a state liable to cause knocking.

Third Embodiment

A third embodiment of the present disclosure is described with reference to FIGS. 12 to 13.

[Characteristic Control in Third Embodiment]

In the above-described first embodiment, when it is predicted that the target EGR rate increases across the contour line shown in FIG. 3, the switching boundary is changed in the direction of decreasing the engine load. In the above-described second embodiment, when it is predicted that the target EGR rate decreases across the contour line shown in FIG. 3, the switching boundary is changed in the direction of decreasing the engine load. The third embodiment takes a change rate of an accelerator opening degree during the transition operation into consideration when the switching boundary described in the first and second embodiments is changed.

Figure 12:
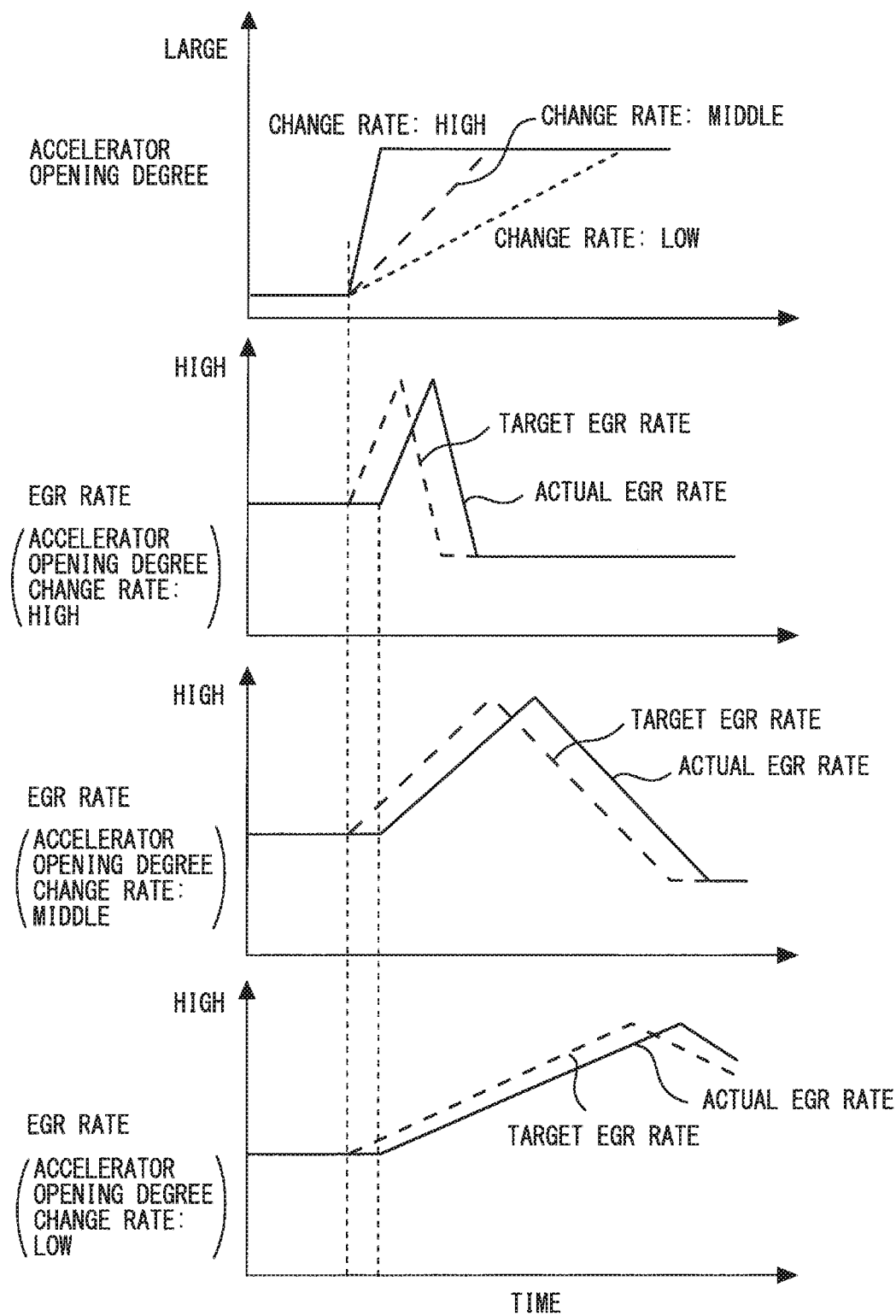
FIG. 12 is time charts describing change rates of the accelerator opening degrees, and transitions of the external EGR rates during the acceleration operation, respectively.

FIG. 12 is time charts describing the change rates of the accelerator opening degrees, and transitions of the external EGR rates during the acceleration operation, respectively. The uppermost time chart of FIG. 12 shows three examples of the change rates of the accelerator opening degrees during the acceleration operation. The second and third uppermost time charts and the lowermost time chart in FIG. 12 show the external EGR rates corresponding to the above-described three examples, respectively. As shown in the second uppermost time chart of FIG. 12, when the change rate (positive change rate) of the accelerator opening degree is large, the target EGR rate and the active EGR rate change in a short time. As shown in the third uppermost time chart and the lowermost time chart in FIG. 12, these EGR rates change gently as the positive change rate of the accelerator opening degree becomes smaller. That is, as the positive change rate of the accelerator opening degree becomes smaller, deviation of the actual EGR rate from the target EGR rate is small, and the influence exerted by the above-described time lag is reduced.

Figure 13:
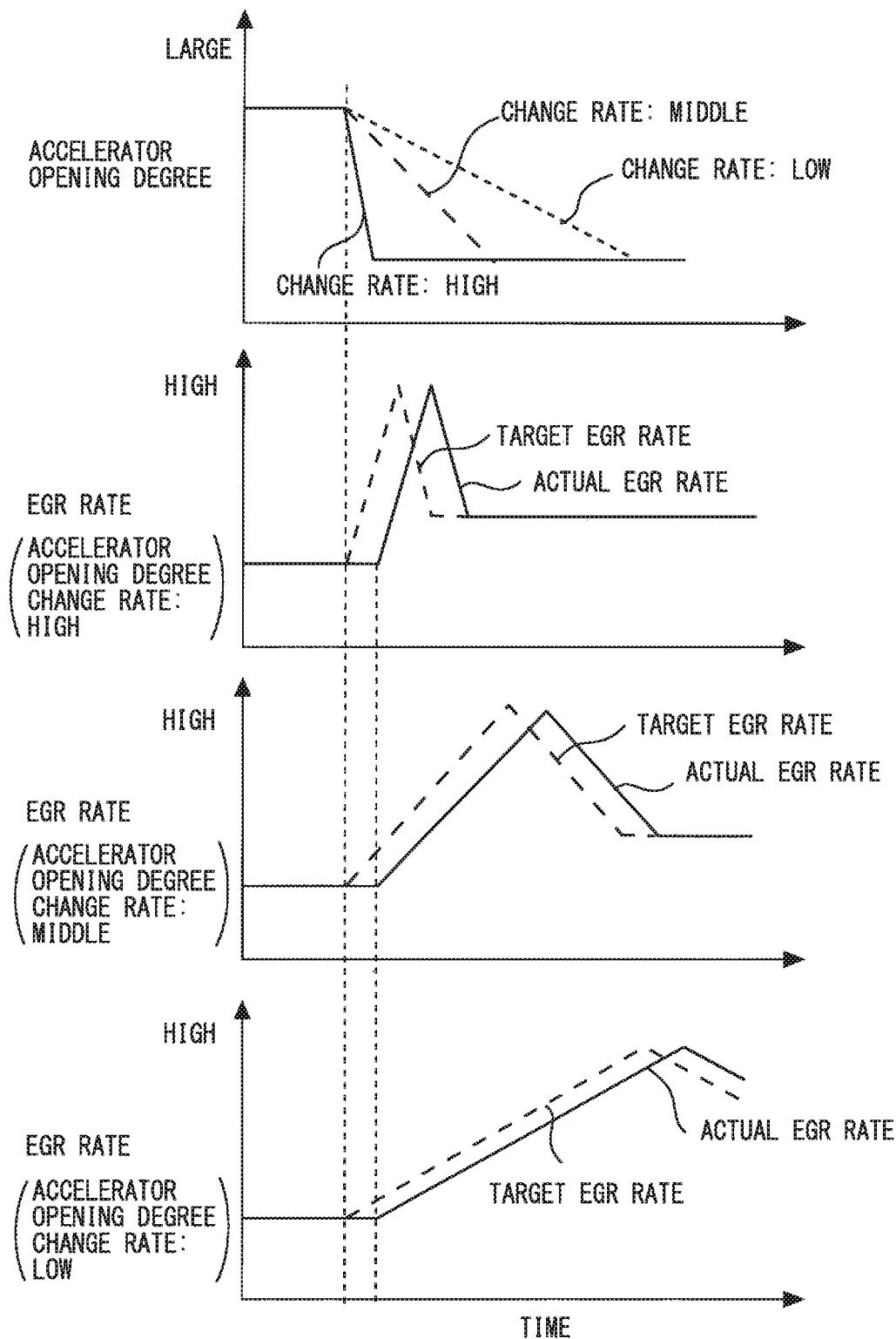
FIG. 13 is time charts describing the change rates of the accelerator opening degrees, and transitions of the external EGR rates during the deceleration operation, respectively.

FIG. 13 is time charts describing the change rates of the accelerator opening degrees, and transitions of the external EGR rates during the deceleration operation, respectively. The uppermost time chart of FIG. 13 shows three examples of the change rates of the accelerator opening degrees during the deceleration operation. The second and third uppermost time charts and the lowermost time chart in FIG. 13 show the external EGR rates corresponding to the above-described three examples, respectively. As shown in the second uppermost time chart of FIG. 13, when the change rate (negative change rate) of the accelerator opening degree is large, the target EGR rate and the active EGR rate change in a short time. As shown in the third uppermost time chart and the lowermost time chart in FIG. 13, these EGR rates change gently as the negative change rate of the accelerator opening degree become smaller. That is, as the negative change rate of the accelerator opening degree becomes smaller, deviation of the actual EGR rate from the target EGR rate is small, and the influence exerted by the above-described time lag is reduced.

Figure 14:
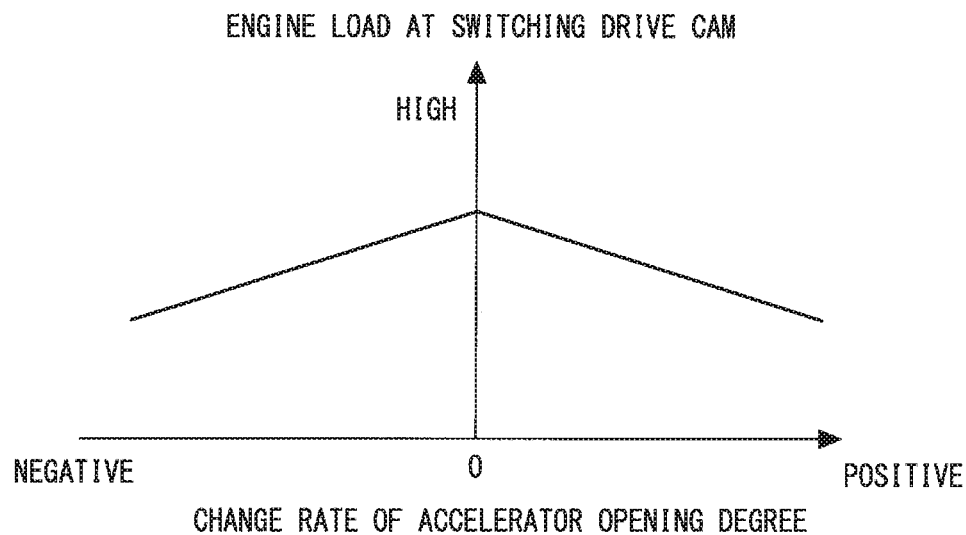
FIG. 14 is a graph describing a method of adjusting a switching boundary in a third embodiment of the present disclosure.

In the third embodiment, a position of the switching boundary is adjusted in accordance with the positive or negative change rate of the accelerator opening degree during the transition operation. FIG. 14 is a graph describing a method of adjusting the switching boundary in the third embodiment of the present disclosure. As shown in FIG. 14, during the acceleration operation in which the change rate of the accelerator opening degree becomes a positive value, the engine load at the switching boundary is set to a lower value as the positive change rate becomes larger. That is, during the acceleration operation, the degree of the change of the switching boundary is increased as the positive change rate becomes larger. During the deceleration operation in which the change rate of the accelerator opening degree becomes a negative value, the engine load at the switching boundary is set to a lower value as the negative change rate becomes larger. That is, during the deceleration operation, the degree of the change of the switching boundary is increased as the negative change rate becomes larger.

According to the third embodiment, when the influence by the above-described time lag is strong, the drive cam can be switched earlier to the small cam by adjusting the switching boundary to the lower engine load side as shown in FIG. 7 (during the acceleration operation). Alternatively, the switching to the large cam can be delayed by adjusting the switching boundary to the lower engine load side as shown in FIG. 10 (during the deceleration operation). When the influence by the above-described time lag is weak, the switching boundary shown in FIG. 7 or FIG. 10 can approach the switching boundary during the steady operation. In any case, the in-cylinder condition in the period during which the actual EGR rate does not achieve the target EGR rate is improved in accordance with the degree of the influence by the time lag, to avoid a state liable to cause knocking. It is to be noted that an engine load value when the change rate of the accelerator opening degree equals zero as shown in FIG. 14 corresponds to the engine load value at the switching boundary during the steady operation shown in FIG. 4.

Fourth Embodiment

Figure 15:
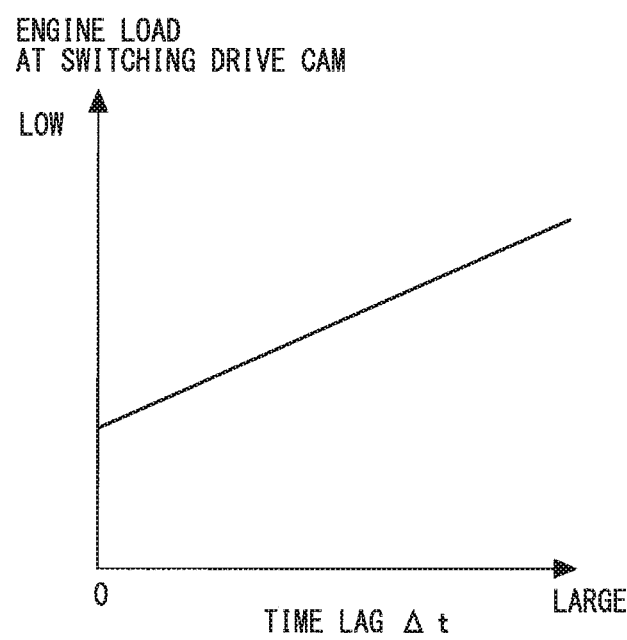
FIG. 15 is a graph describing a method of adjusting a switching boundary in a fourth embodiment of the present disclosure.

A fourth embodiment of the present disclosure is described with reference to FIG. 15.

[Characteristic Control in Fourth Embodiment]

In the first embodiment, the switching boundary is changed in the direction of decreasing the engine load when the target EGR rate increases across the contour line shown in FIG. 3. As described above, this reason is because the time lag produces the period during which the actual EGR rate does not achieve the target EGR rate. In the fourth embodiment, the ECU calculates the actual EGR rate during the transition operation to predict the time lag. The actual EGR rate is calculated based on an intake air amount, a supercharging pressure and an actual opening degree of the EGR valve, for example. The time lag corresponds to a time interval from a change point of the target EGR rate during the transition operation to an increase starting point of the actual EGR rate. Therefore, the actual EGR rate during the transition operation is calculated to obtain the above-described time interval, and the actual time lag $\Delta t$ can be thereby predicted.

In the fourth embodiment, a position of the switching boundary is adjusted based on the predicted time lag $\Delta t$. FIG. 15 is a graph describing a method of adjusting the switching boundary in the fourth embodiment of the present disclosure. As shown in FIG. 15, the degree of the change of the switching boundary is increased as the predicted time lag $\Delta t$ becomes larger. That is, the engine load at the switching boundary is set to a lower value as the predicted time lag $\Delta t$ becomes larger. It is to be noted that the engine load value when the time lag $\Delta t$ equals zero as shown in FIG. 15 corresponds to the engine load value at the switching boundary during the steady operation shown in FIG. 4.

According to the fourth embodiment, the in-cylinder condition can be improved in the period during which the actual EGR rate does not achieve the target EGR rate, to avoid a state liable to cause knocking.

Other Embodiment

The above-described first to fourth embodiments are described on the assumption that the internal combustion engine is provided with an LPL-EGR device. However, the internal combustion engine may be provided with an HPL-EGR (high pressure loop—EGR) device instead of the LPL-EGR device. The internal combustion engine may be provided with a non-supercharging EGR device instead of the LPL-EGR device. The internal combustion engine may be provided with both of the LPL-EGR device and the HPL-EGR device. However, considering that easiness of occurrence of the knocking when the external EGR rate is reduced, the methods described in the above-described first to fourth embodiments are particularly effective in the internal combustion engine provided with the LPL-EGR device. This reason is described with reference to FIG. 16.

Figure 16:
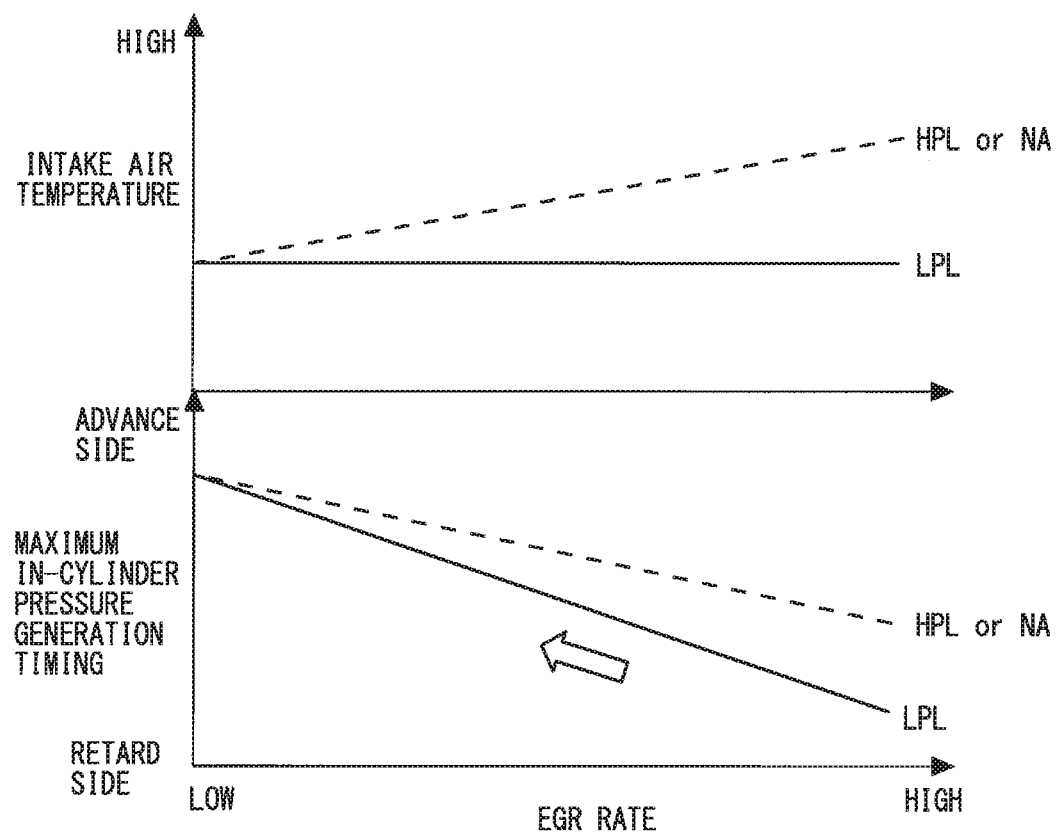
FIG. 16 is graphs showing a relationship between an external EGR rate and an intake air temperature and a relationship between the external EGR rate and a crank angle at which an in-cylinder pressure is highest (maximum in-cylinder pressure generation timing), respectively, in three types of internal combustion engines to which the present disclosure is applicable.

FIG. 16 is graphs showing a relationship between an external EGR rate and an intake air temperature and a relationship between the external EGR rate and a crank angle at which an in-cylinder pressure is highest (maximum in-cylinder pressure generation timing), respectively, in an internal combustion engine provided with an LPL-EGR device LPL, an internal combustion engine provided with an HPL-EGR device HPL, and an internal combustion engine provided with a non-supercharging EGR device NA. As shown in the upper graph of FIG. 16, the intake air temperature decreases as the external EGR rate decreases in the HPL and the NA, and the intake air temperature is not almost changed even when the external EGR rate decreases in the LPL. This reason is because exhaust gas of relatively low temperature on a downstream side of an exhaust turbine is recirculated in the LPL. As shown in the lower graph of FIG. 16, a variation width of the maximum in-cylinder pressure generation timing when the external EGR rate decreases becomes small in the HPL and the NA, and becomes large in the LPL. As seen from the lower graph of FIG. 16, the maximum in-cylinder pressure generation timing is moved to an advance side. That is, the knocking easily occurs when the external EGR rate decreases in any of the LPL, the HPL, and the NA. The in-cylinder condition is improved somewhat in the HPL and the NA because the intake air temperature decreases as the external EGR rate decreases. In contrary, in the LPL, the variation width of the maximum in-cylinder pressure generation timing is large when the external EGR rate is decreased, and the intake air temperature is not changed. As compared with the HPL and the NA, LPL is particularly in the state in which the knocking easily occurs when the external EGR rate is decreased. Therefore, the methods described in the above-described first to fourth embodiments are particularly effective in the internal combustion engine provided with the LPL-EGR device.

The above-described first to fourth embodiments are described on the assumption that the small cam has a small lift amount and a small operating angle, and the large cam has a large lift amount and a large operating angle. However, the decrease of the suction efficiency described in FIG. 7 and FIG. 10 depends largely on the operating angle of the small cam and the intake valve closing timing when the small cam is used as the drive cam. Accordingly, the lift amount of the small cam needs not to be smaller than that of the large cam, and may be equal to that of the large cam. In addition, in the above-described first to fourth embodiments, the drive cam is switched from the large cam to the small cam to change the intake valve closing timing, thereby reducing the suction efficiency. However, a single cam may be used instead of these two types of intake cams, and a posture and a shape of the single cam may be adjusted to change the intake valve closing timing, thereby reducing the suction efficiency.

Figure 17:
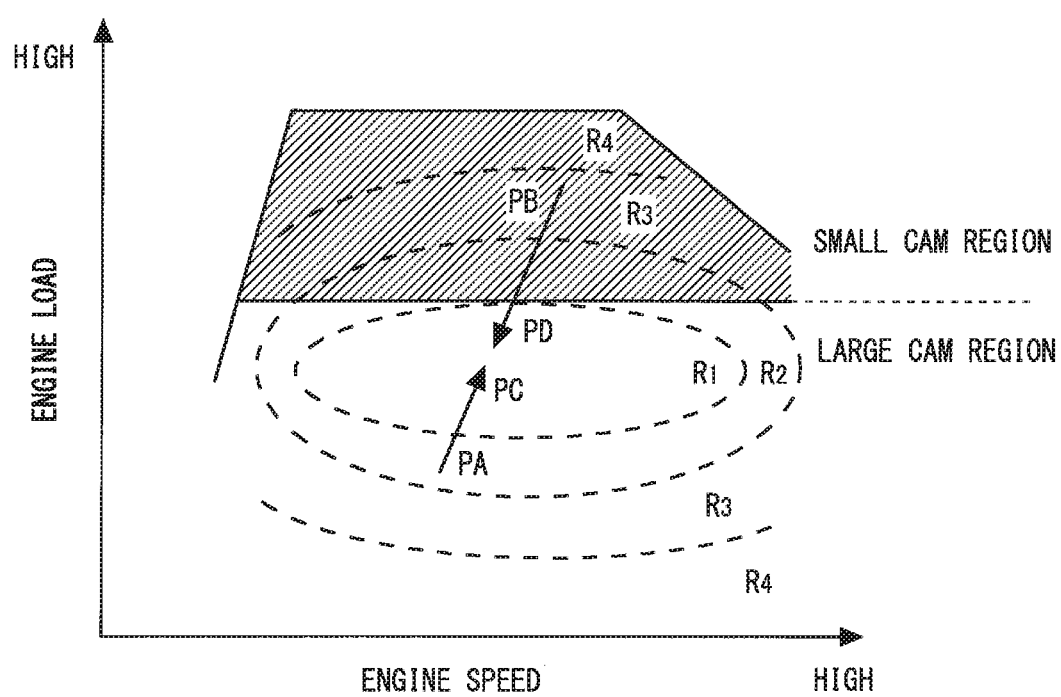
FIG. 17 is a graph describing transfer examples of operating points to which the method described in the first and second embodiments of the present disclosure are applicable.

In the above-described first embodiment, the example is described in which the operating point is transferred from PA to PB. In the above-described second embodiment, the example is described in which the operating point is transferred from PB to PA. However, the methods described in the above-described first and second embodiments can be widely applied when the operating point is transferred from a partitioned range with low target EGR rate to a partitioned range with high target EGR rate. FIG. 17 is a graph describing transfer examples of the operating points to which the method described in the above-described first and second embodiments are applicable. As shown in FIG. 17, when the operating point is transferred from PA to PB, the operating point is transferred from the partitioned range $R_2$ to the partitioned range $R_1$. When the operating point is transferred from PB to PD, the operating point is transferred from the partitioned range $R_3$ to the partitioned range $R_1$. In any case, since the operating point is transferred from the partitioned range with low target EGR rate to the partitioned range with high target EGR rate, the actual EGR rate is affected by the above-described time lag. Accordingly, by applying the methods described in the above-described first and second embodiments, the in-cylinder condition can be improved in the period during which the actual EGR rate does not achieve the target EGR rate, to avoid a state liable to cause knocking.

What is claimed is:

1. An internal combustion engine comprising:
   an exhaust system;
   an air intake system;

an external EGR system for recirculating exhaust gas from the exhaust gas system to the air intake system; and
a control device;
wherein the control device further comprises:
   an EGR map that defines a relationship between an operating range defined by engine speed and engine load and a target value of external EGR rate, and has a predetermined partitioned range in which the target value is set to a highest value; and
   an operating angle map that defines a relationship between the operating range and an operating angle of an intake cam for driving an intake valve of the engine, wherein the operating angle map is set to have:
   a large operating angle being selected in a first region including a region corresponding to the predetermined partitioned range to close the intake valve in a first crank angle section; and
   a small operating angle being selected in a second region in which the engine load is higher than that of the first region to close the intake valve in a second crank angle section that is located nearer to a bottom dead center side than the first crank angle section;
wherein the control device includes executable instructions stored in a microprocessor to:
   select the operating angle in accordance with the operating angle map when the engine operating state stays in a partitioned range having the equal target value in the EGR map; and
   change a boundary between the first region and the second region in a direction of decreasing the engine load, and then select the operating angle in accordance with the operating angle map when the engine operating state is transferred from a partitioned range with the low target value to a partitioned range with the high target value in the EGR map.

2. The internal combustion engine according to claim 1, wherein the control device further includes executable instructions to:
   increase a degree of a change of the boundary as a positive change rate of an accelerator opening degree of the engine becomes larger when the engine operating state is transferred from a partitioned range with the low target value to a partitioned range with the high target value in the EGR map and in a direction of increasing the engine speed and the engine load; and
   increase the degree of the change of the boundary as a negative change rate of the accelerator opening degree becomes larger when the engine operating state is transferred from the partitioned range with the low target value to the partitioned range with the high target value in the EGR map and in a direction of decreasing the engine speed and the engine load.

3. The internal combustion engine according to claim 1, wherein the control device further includes executable instructions to:
   determine a time interval from a change point of the target value set in accordance with the EGR map to an increase starting point of an actual external EGR rate and increase the degree of the change of the boundary as the time interval is larger when the engine operating state is transferred from a partitioned range with the low target value to a partitioned range with the high target value in the EGR map.

4. The internal combustion engine according to claim 1, further comprising a turbocharger including a compressor and a turbine;
   wherein the external EGR system recirculates the exhaust gas from a downstream side of the turbine to an upstream side of the compressor.

* * * * *